US006695241B2

(12) United States Patent
Iino

(10) Patent No.: US 6,695,241 B2
(45) Date of Patent: Feb. 24, 2004

(54) CARTRIDGE

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/342,275

(22) Filed: Jan. 15, 2003

(65) Prior Publication Data

US 2003/0132333 A1 Jul. 17, 2003

(30) Foreign Application Priority Data

Jan. 15, 2002 (JP) ........................................ 2002-005512

(51) Int. Cl.[7] .............................................. G11B 15/66
(52) U.S. Cl. ...................................... 242/348; 360/132
(58) Field of Search ................................ 242/344, 347, 242/348; 360/60, 132, 133; 369/291

(56) References Cited

U.S. PATENT DOCUMENTS

| 4,734,812 A | | 3/1988 | Tanaka et al. | |
|---|---|---|---|---|
| 5,371,644 A | * | 12/1994 | Hoge et al. | 360/132 |
| 5,418,672 A | * | 5/1995 | Tischler | 360/132 |
| 5,636,094 A | * | 6/1997 | Schoettle et al. | 360/132 |
| 5,748,419 A | * | 5/1998 | Langseth et al. | 360/133 |
| 5,798,899 A | * | 8/1998 | Urano et al. | 360/132 |
| 6,452,746 B1 | * | 9/2002 | Sasaki et al. | 360/132 |
| 6,466,405 B1 | * | 10/2002 | Rambosek | 360/132 |
| 6,477,010 B1 | * | 11/2002 | Johnson et al. | 360/132 |
| 6,583,955 B2 | * | 6/2003 | Kano et al. | 360/132 |

* cited by examiner

Primary Examiner—William A. Rivera
(74) Attorney, Agent, or Firm—Sughrue Mion, PLLC

(57) ABSTRACT

A cartridge has an angled face formed at a rear end side of a case accommodating a recording medium. An operation portion for switching between two modes is provided on the angled surface. The two modes are a mode which enables recording of the recording medium and a mode which disables recording. The angled face comprises an opening. A write-protect portion, which switches the cartridge between the two modes, is provided with the operation portion, which is for switching between the modes, and is disposed near the opening. The operation portion is operated by an operating movement. Resultantly, in a writing-disabled state, an opening/closing plate of the write-protect portion is positioned at the opening, and in a recording-enabled state, the opening/closing plate is moved away from the opening. Thus, a user can judge from the rear end side which of the two modes the cartridge is in.

21 Claims, 18 Drawing Sheets

CARTRIDGE

BACKGROUND OF THE INVENTION

1. Field of the Invention

The present invention relates to a cartridge which accommodates a recording medium, and more specifically relates to a recording medium cartridge which is provided with a write-protect portion which switches a state of the cartridge between a mode which enables recording to the accommodated recording medium and a mode which disables recording.

2. Description of the Related Art

Cartridges which accommodate a recording medium in a case are widely used. Such cartridges are often accommodated in a library or the like. Because of requirements for taking a cartridge out from the library or the like, an angled surface is often formed by cutting away an edge portion at a case back face side (case rear side) of the cartridge. (For example, the angled surface may have a form corresponding to cutting away an edge portion at which a back face and a lower face of a lower case would otherwise have intersected.)

In such a case, the area of a "label area" at the back face side of the case, which is a portion of an outer side of a case rear wall, and which is continuous with the angled surface and orthogonal to an upper face and a lower face of the case, is reduced. Accordingly, if a write-protect portion, which prevents accidental erasure of data recorded on the recording medium, is provided at the back face side of the case, an opening which structures the write-protect portion must be formed in the rear wall of the case, and the label area becomes even smaller. Accordingly, there are also cartridges in which the write-protect portion is provided not at the back face side of the case but at a front face side or a side face side thereof.

However, in a state in which a cartridge is accommodated in a library, a user can only observe the back face side of the cartridge. Therefore, there has been a problem in that users cannot determine by visual inspection whether a cartridge accommodated in a library is in a recording-enabled state or in a recording-disabled state.

SUMMARY OF THE INVENTION

In consideration of the circumstances described above, an object of the present invention is to provide a cartridge with which a user can determine whether the cartridge is in a recording-enabled state or a recording-disabled state by observing a back face side of the cartridge, without a label area being reduced, even when an angled surface is formed at the cartridge back face side.

A first aspect of the present invention is a cartridge for accommodating a recording medium, the cartridge being loadable in a predetermined direction at a drive device, and being selectively switchable between at least two modes, one of the modes allowing writing of information to the recording medium, and another of the modes prohibiting writing of information to the recording medium, the cartridge comprising: a case for accommodating the recording medium and including an outer wall face at a rear end of the case relative to the predetermined direction of loading and an angled face adjacent to the outer wall face, the angled face including an opening; and a switching member for switching between the modes, the switching member including an operation portion for the switching, the operation portion being exposed through the opening.

The case further includes an upper outer face and a lower outer face, and the angled face is formed at a boundary region between the rear end outer wall face and one of the upper outer face and the lower outer face. The switching member is provided so as to be slideable along the angled face, and switches between the modes by being slid.

Hereinafter, references to a rear end side or back end side in the present specification mean a side facing in a direction opposite to a direction of loading when the cartridge is inserted at a drive device at which the cartridge is loadable or at an accommodation shelf in a library or the like, that is, a rear end side of the cartridge.

According to the first aspect of the present invention, even though the angled surface is formed at the rear end side of the case, because the opening is formed in the angled surface, a user can visually inspect the back face side and judge whether the cartridge is in a recording-enabled state or a recording-disabled state, even though the label area of the outer side of the case rear wall, which label area is orthogonal to the case upper face and lower face and is continuous with the angled surface, is not reduced in size. Therefore, even if the cartridge is in a state of accommodation in a library, the user can easily determine whether the cartridge is in the recording-enabled state or the recording-disabled state by observing the back face side of the cartridge.

Further, because the operation portion is exposed through the opening, the operation portion can be easily switched between the recording-enabled state and the recording-disabled state by application of a movement force to the operation portion.

DESCRIPTION OF THE PREFERRED EMBODIMENTS

Hereafter, a magnetic tape cartridge accommodating a recording medium, which is a magnetic tape wound onto a single reel, is embodied, and embodiments of the present invention are described.

First Embodiment

Firstly, a first embodiment will be described. A direction of loading a magnetic tape cartridge into a drive device (the direction of an arrow P) is taken to be a forward direction, and front, back, left, right, up and down are taken with reference to a case of looking in the direction of the arrow P.

Figure 1:
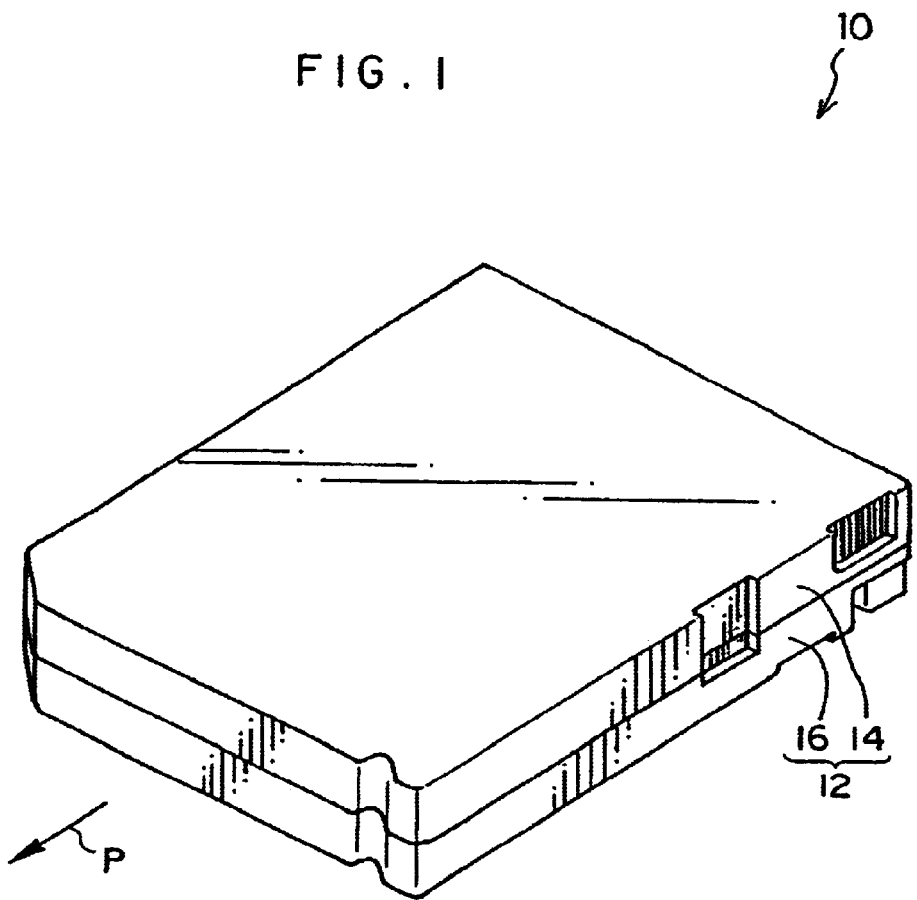
FIG. 1 is a top perspective view of a cartridge relating to a first embodiment.

As shown in FIG. 1, a case 12 of a magnetic tape cartridge 10 (hereinafter, referred to simply as "the cartridge 10") is assembled to be a rectangular box-shaped case by matching up peripheral wall portions of an upper case 14 and a lower case 16, which are made of synthetic resin, to one another. A single reel (not shown), at which a magnetic tape is wound, is rotatably accommodated in the case 12. This reel is urged downward by a spring (not shown) provided between the upper case 14 and the reel. Thus, the reel is vertically displaceable.

Figure 2:
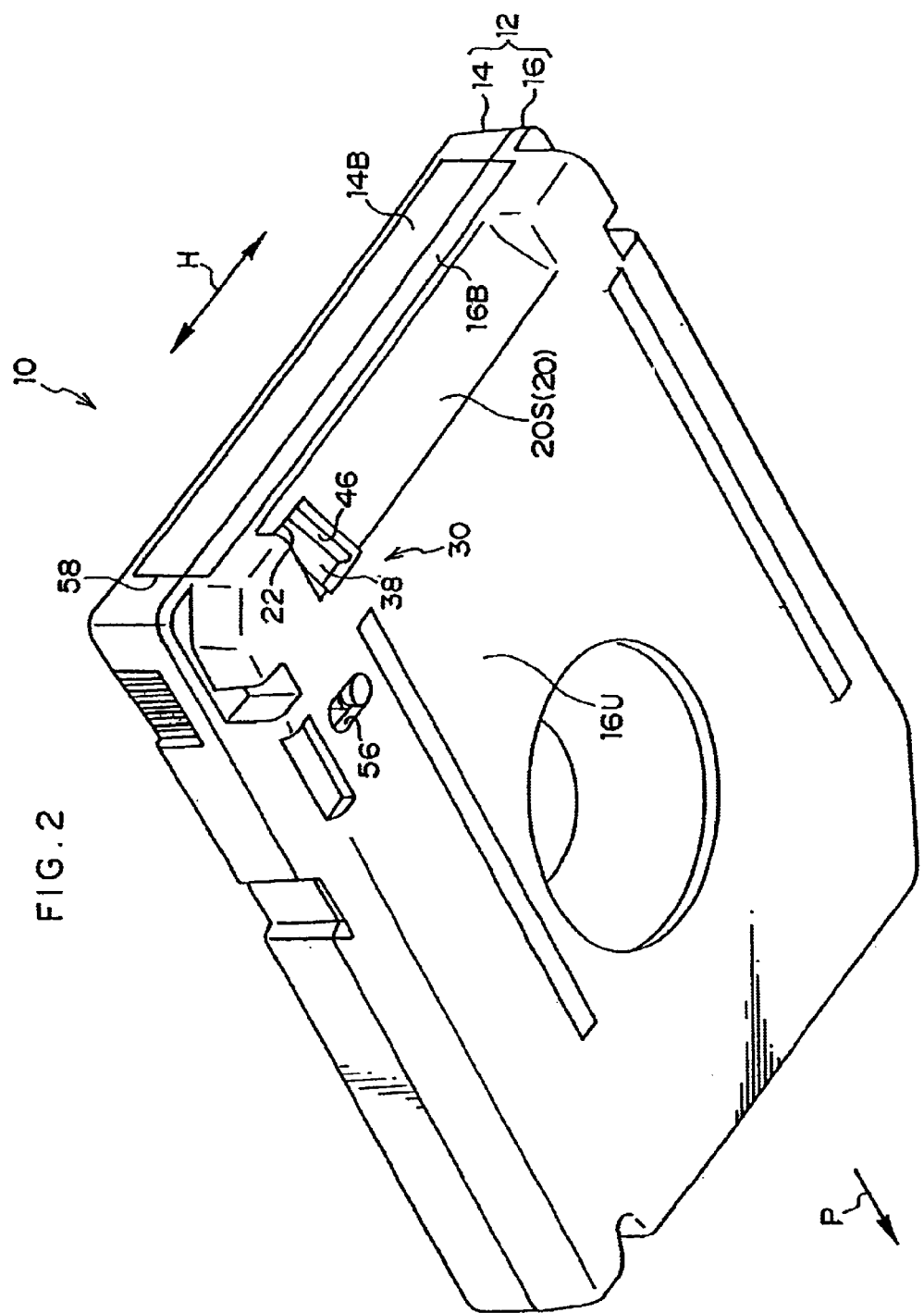
FIG. 2 is a back perspective view of the cartridge relating to the first embodiment, and shows a recording-disabled state.
Figure 3:
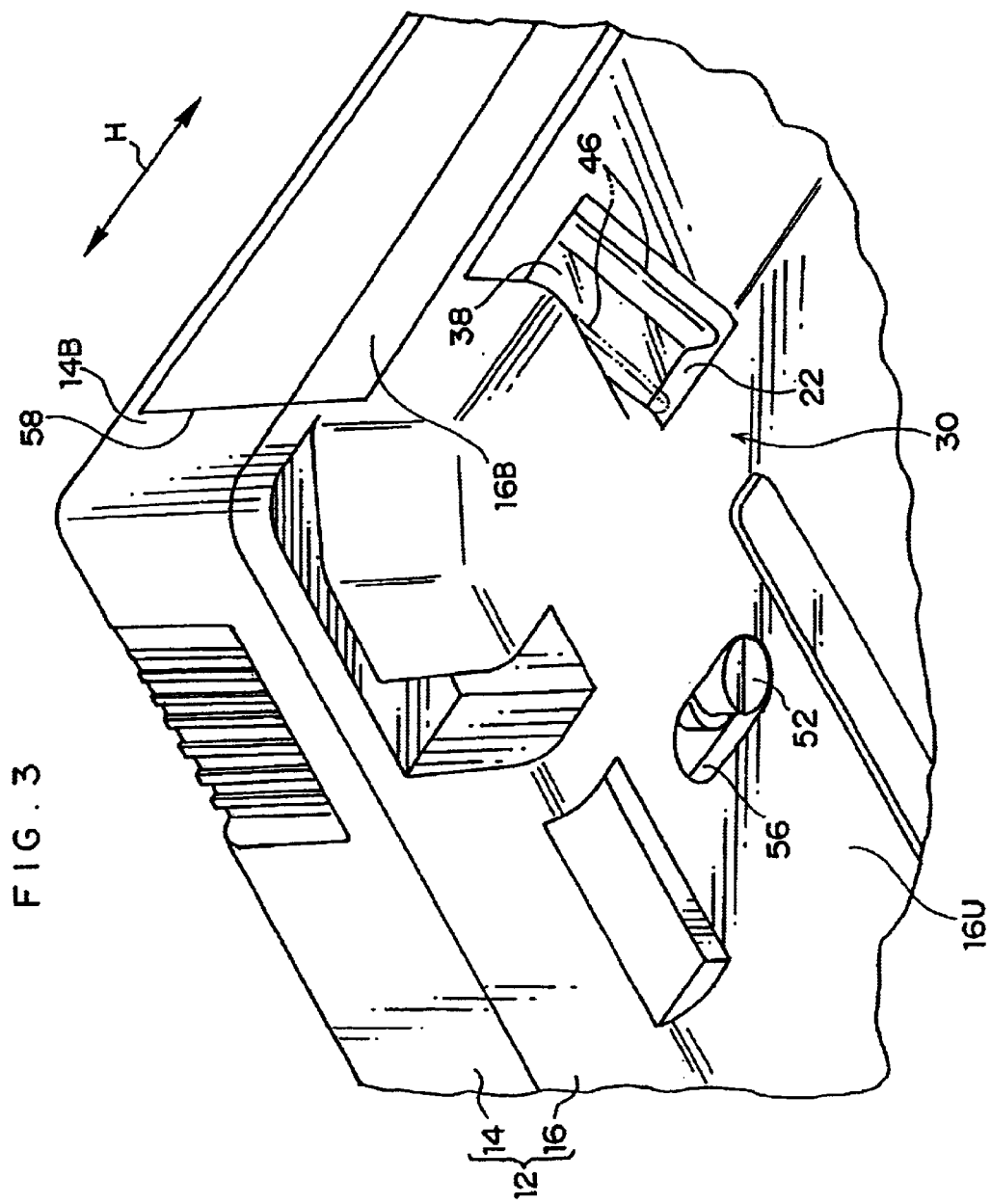
FIG. 3 is a partially enlarged view of the cartridge relating to the first embodiment.

As shown in FIGS. 2 and 3, an angled wall 20 is formed at the lower case 16. The angled wall 20 is provided with an angled surface 20S which has a form corresponding to cutting away an edge portion at which a back face and a lower face of the lower case 16 would otherwise have intersected. An acute angle θ between the angled wall 20 and a lower wall 16U which structures the lower case 16 may be, for example, 30° (see FIG. 6).

A write-protect portion 30, which prevents mistaken erasure of data recorded on the magnetic tape, is provided at a rear portion of the cartridge 10.

Figure 4:
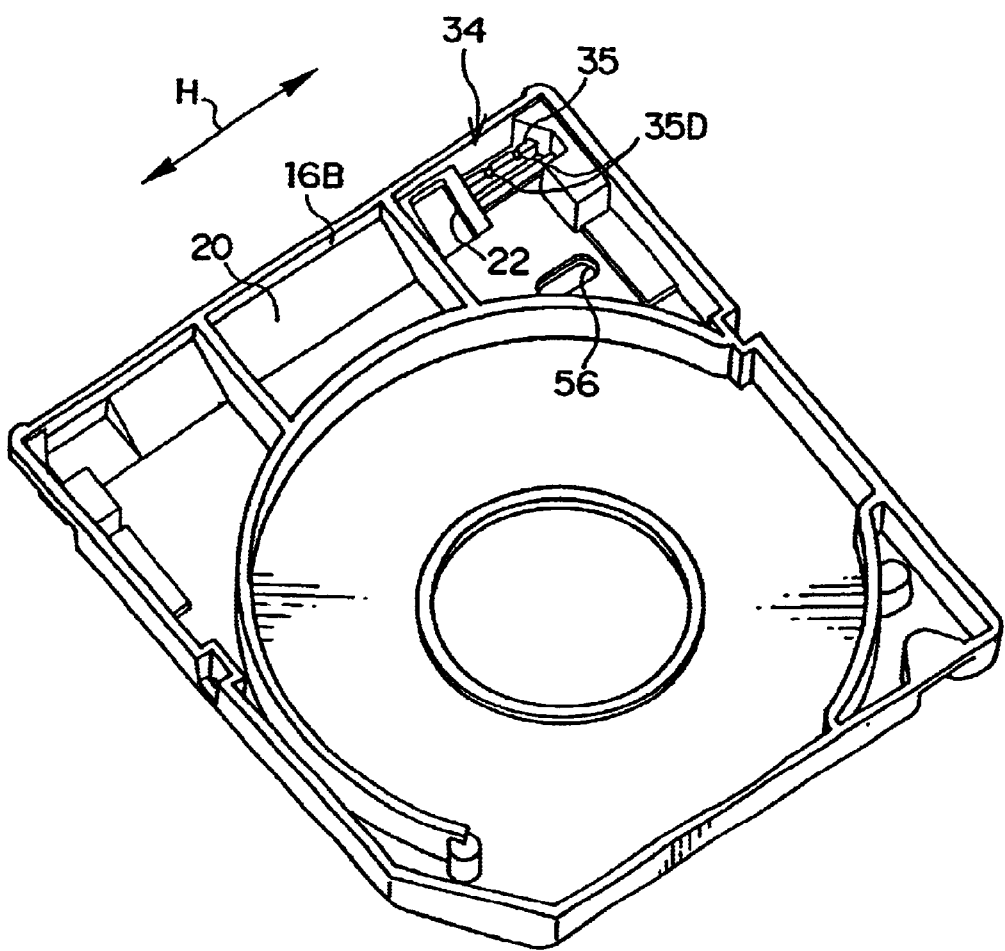
FIG. 4 is a perspective view showing a lower case of the cartridge relating to the first embodiment.
Figure 5:
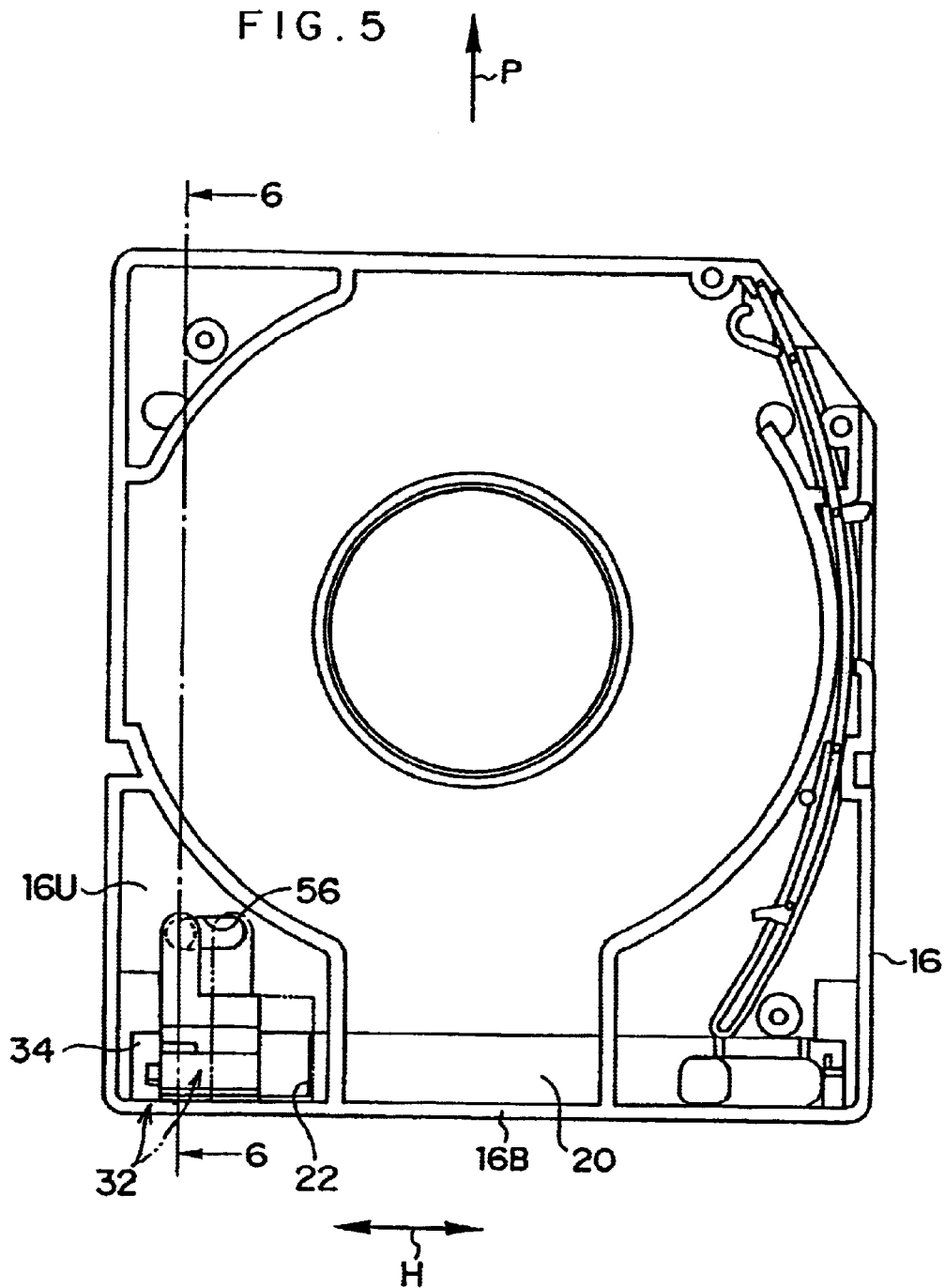
FIG. 5 is a plan view of the lower case of the cartridge relating to the first embodiment, which view shows a state in which an erroneous erasure prevention plug is slidingly moveably attached at the lower case of the cartridge.
Figure 6:
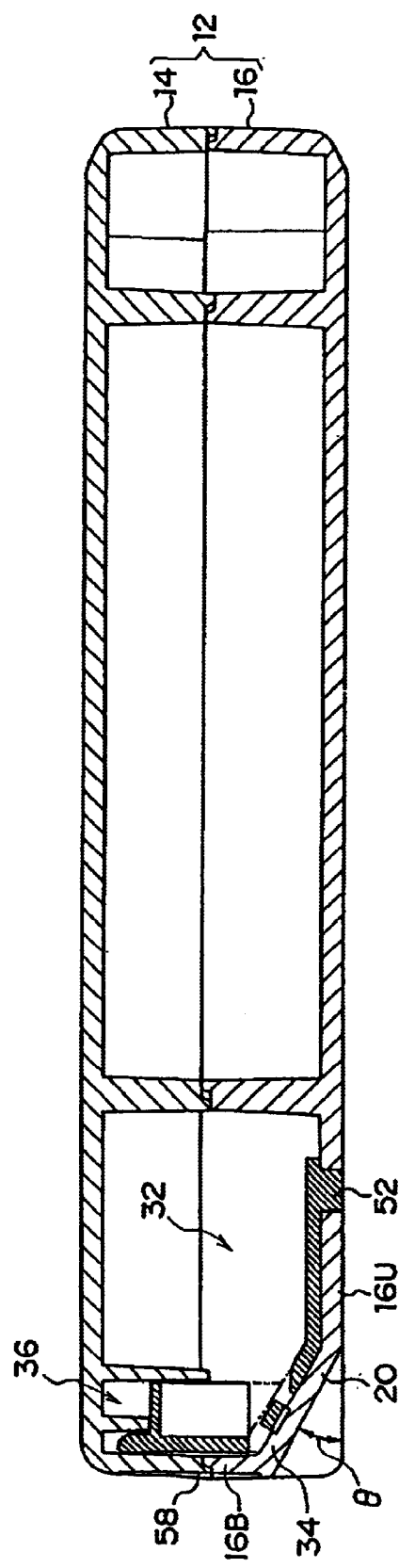
FIG. 6 is a side sectional view, cut along the line indicated by arrows 6—6 in FIG. 5, showing the cartridge relating to the first embodiment.

The write-protect portion 30 includes an erroneous erasure prevention plug 32 (see FIGS. 5 and 6) and a support portion 34 (see FIGS. 4 to 6). The plug 32 switches, by slidingly moving, between a state in which recording onto the magnetic tape is enabled and a state in which recording is disabled. The support portion 34 is provided at the lower case 16 and supports the plug 32 such that the plug 32 is slidingly moveable in a left-right direction (a direction H which intersects the direction P) along a rear wall 16B of the lower case 16. The write-protect portion 30 also includes a restricting portion 36 inside the upper case 14 (see FIG. 6). The restricting portion 36 prevents the plug 32 from moving upward and separating from the support portion 34.

Figure 7:
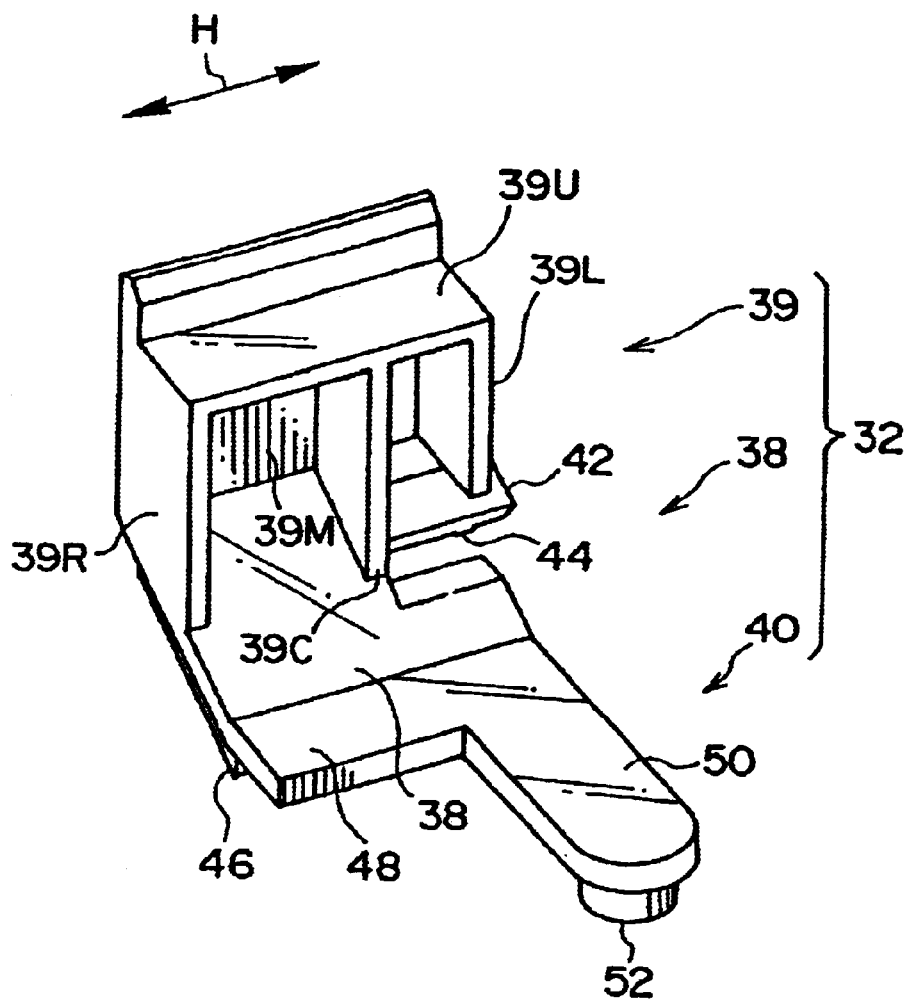
FIG. 7 is a perspective view of the erroneous erasure prevention plug provided at the cartridge relating to the first embodiment.
Figure 8:
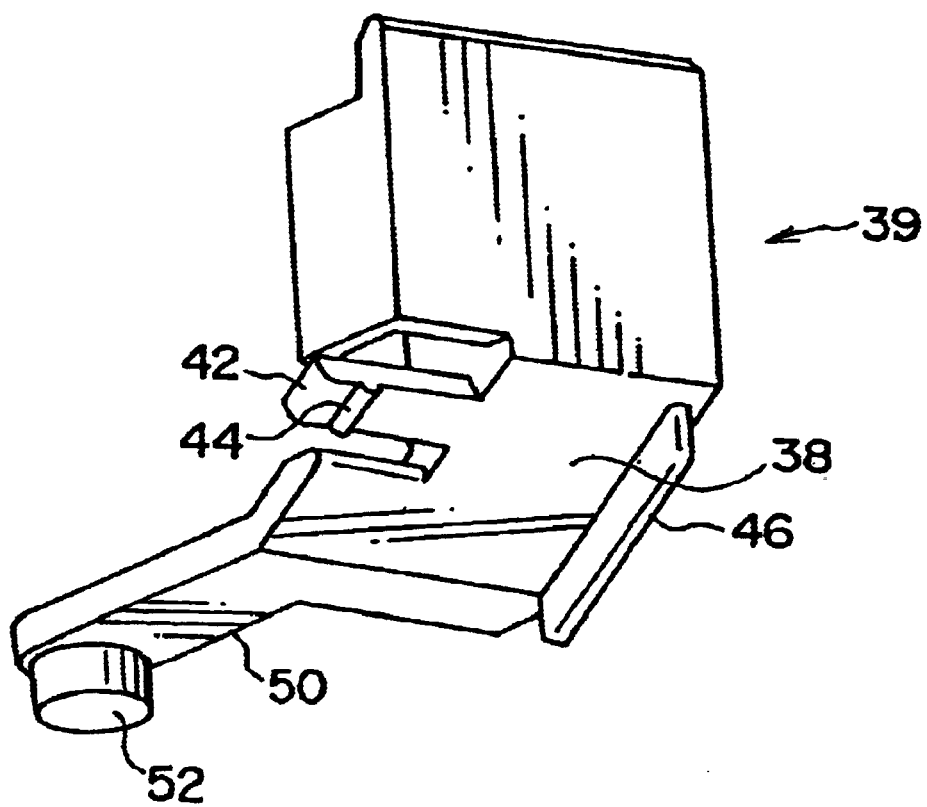
FIG. 8 is a back perspective view, seen from diagonally downward, of the erroneous erasure prevention plug provided at the cartridge relating to the first embodiment.
Figure 9:
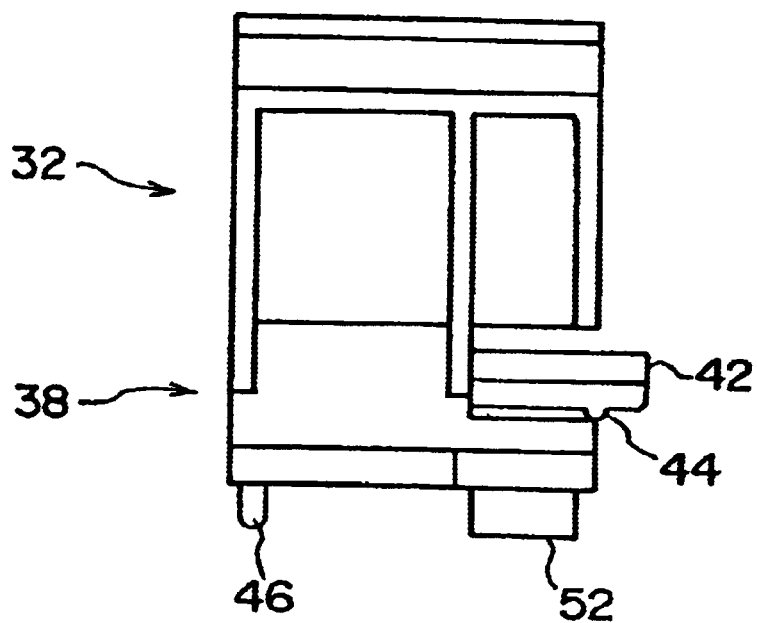
FIG. 9 is a front view of the erroneous erasure prevention plug provided at the cartridge relating to the first embodiment.
Figure 10:
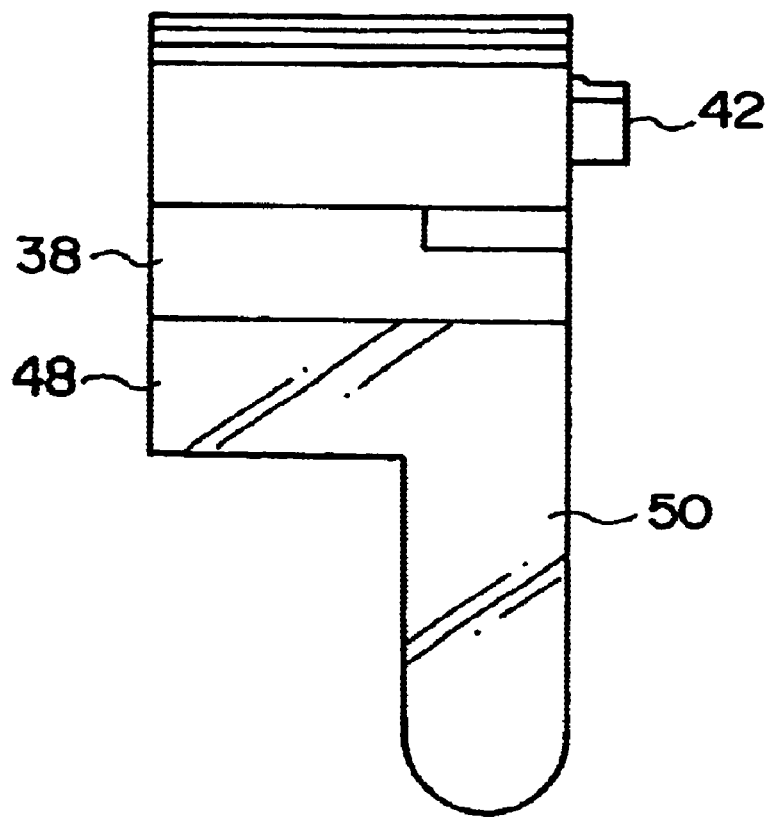
FIG. 10 is a plan view of the erroneous erasure prevention plug provided at the cartridge relating to the first embodiment.
Figure 11:
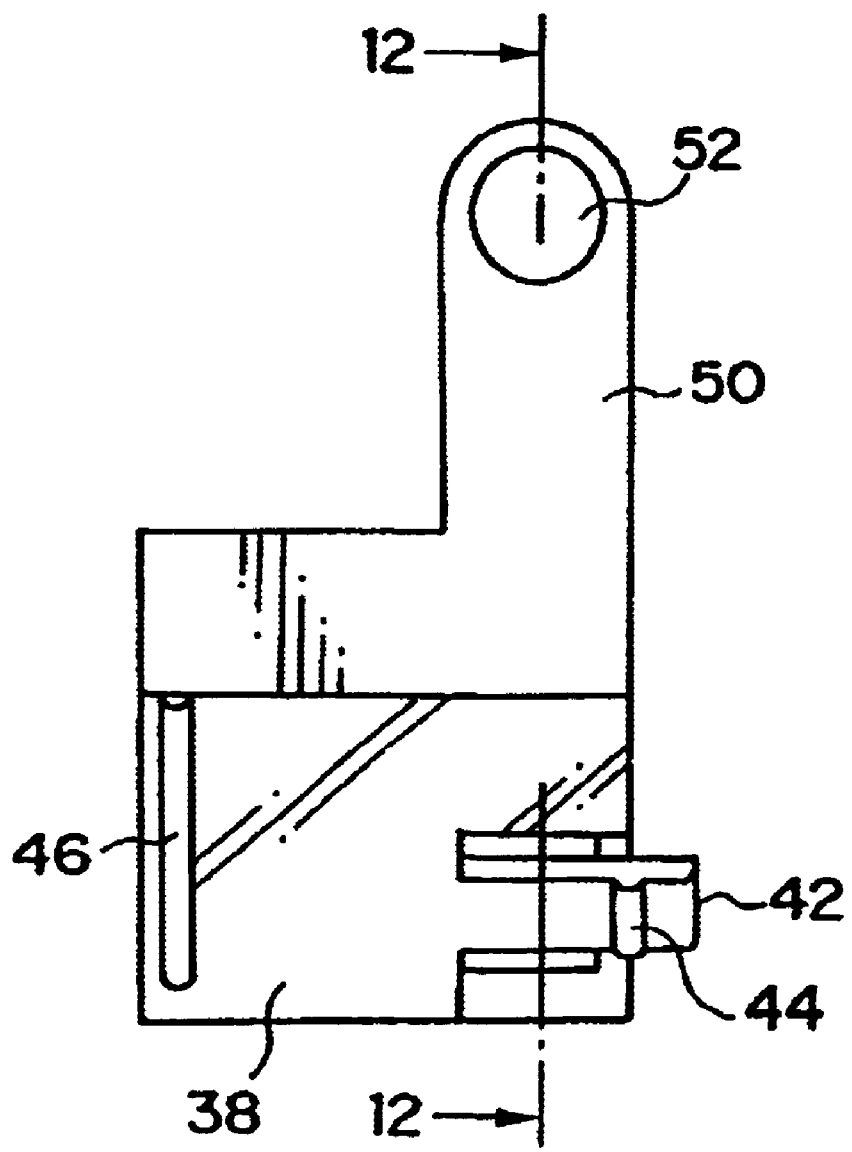
FIG. 11 is a bottom view, seen from below, of the erroneous erasure prevention plug provided at the cartridge relating to the first embodiment.
Figure 12:
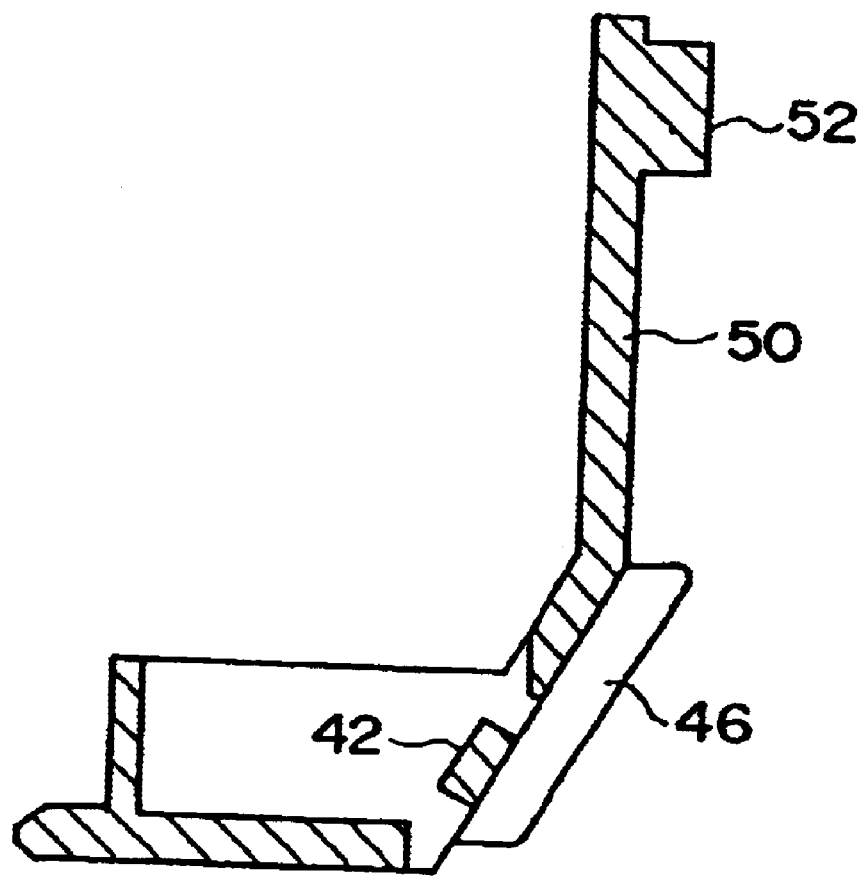
FIG. 12 is a side sectional view, cut along the line indicated by arrows 12—12 in FIG. 11, showing the erroneous erasure prevention plug.
Figure 13:
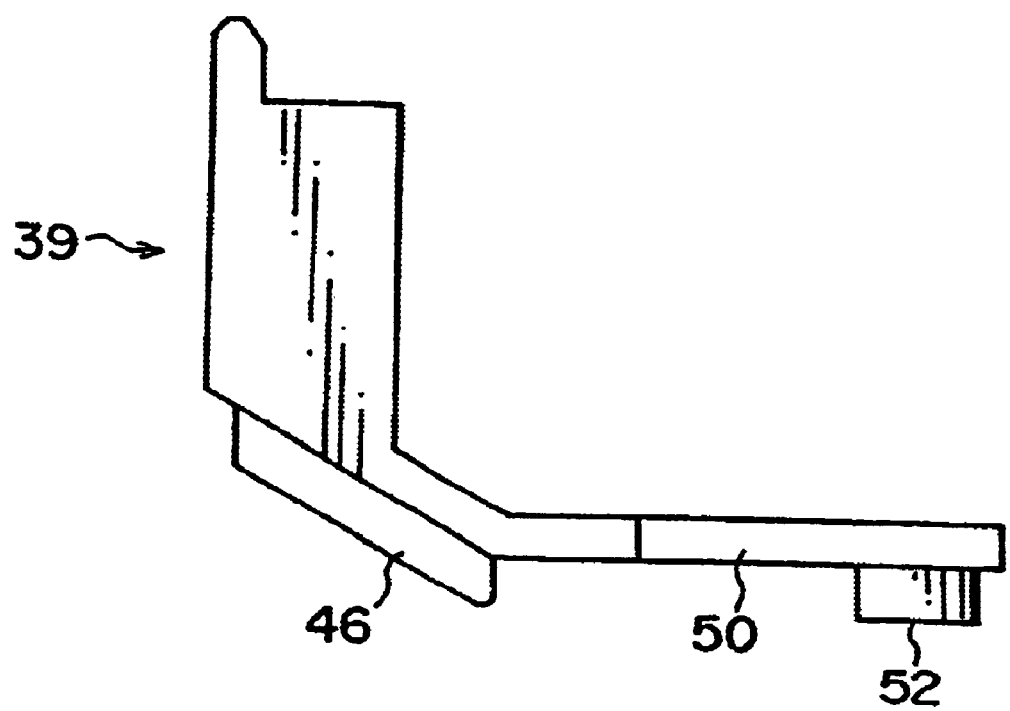
FIG. 13 is a side view of the erroneous erasure prevention plug provided at the cartridge relating to the first embodiment.
Figure 14:
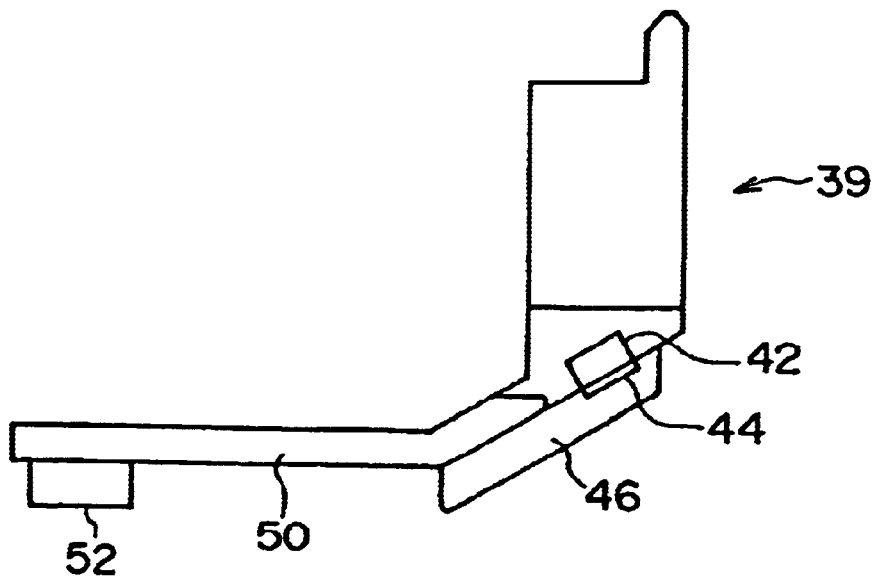
FIG. 14 is a side view of the erroneous erasure prevention plug provided at the cartridge relating to the first embodiment.
Figure 15:
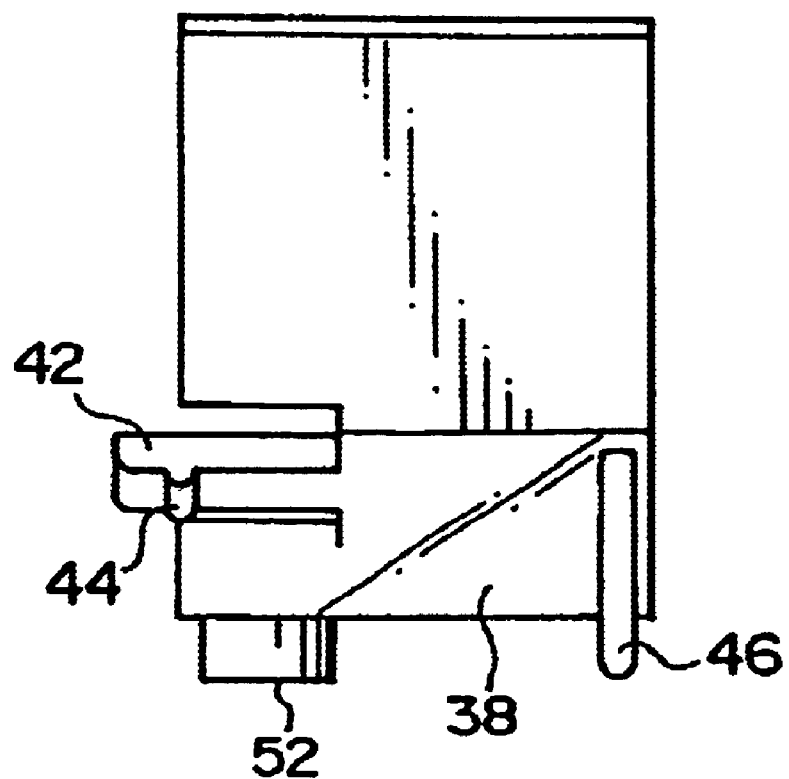
FIG. 15 is a back view of the erroneous erasure prevention plug provided at the cartridge relating to the first embodiment.

As shown in FIGS. 2 to 15, an opening/closing plate portion 38, an upper structure 39 (restricted portion), and a lower structure 40 (supported portion) are provided at the plug 32 (see FIG. 7). The opening/closing plate portion 38 is positioned inside the angled wall 20 and is a part which implements opening and closing of an aperture 22, which is formed in the angled wall 20. The upper structure 39 is disposed at an upper side of the opening/closing plate portion 38, and is a part whose upward movement is restricted by the restricting portion 36. The lower structure 40 extends forward (in the direction P) from the opening/closing plate portion 38, and is a part which is supported by and slides along an inner wall face of the lower wall 16U.

A rib-like part 46 (finger-engaging portion), for engaging with and being moved by fingers, is formed at an outer side of the opening/closing plate portion 38, and is exposed through the aperture 22.

A retention plate portion 42 is provided at the opening/closing plate portion 38. The retention plate portion 42 extends in the left-right direction, and is a part for maintaining the recording-enabled state or recording-disabled state of the write-protect portion 30. The retention plate portion 42 includes an engaging rib 44 at an outer face side thereof. A standing plate 35 is standingly provided at the support portion 34. The engaging rib 44 enters into and comes out of engaging grooves 35D in the standing plate 35 (see FIG. 4). Consequently, when at least a certain movement force is applied to the finger-engaging portion 46 and the plug 32 is slidingly moved, the engaging rib 44 enters one of the engaging grooves 35D in accordance with a recording-enabled position or a recording-disabled position and generates a "click" sound. Thus, the plug 32 is lightly held in place.

The upper structure 39 includes a sliding plate portion 39M, a right reinforcing plate portion 39R, a central reinforcing plate portion 39C, and a left reinforcing plate portion 39L. The sliding plate portion 39M is slidingly moveable along the rear wall 16B of the lower case 16. The right reinforcing plate portion 39R and central reinforcing plate portion 39C are continuous with an inner side of the sliding plate portion 39M and an inner side of the opening/closing plate portion 38. The left reinforcing plate portion 39L is continuous with an inner side of the restricted portion. The upper structure 39 also includes an upper reinforcing plate portion 39U, which is continuous with upper ends of the right reinforcing plate portion 39R, the central reinforcing plate portion 39C and the left reinforcing plate portion 39L, and is continuous with the inner side of the sliding plate portion 39M. Because of this structure, structural strength of the upper structure 39 and the opening/closing plate portion 38 is raised.

The lower structure 40 is provided with a edge plate portion 48 and a leg portion 50. The edge plate portion 48 is continuous with the opening/closing plate portion 38. The leg portion 50 extends forward from the edge plate portion 48. A short cylindrical distinguishing portion 52 (a detectable portion) is formed at a lower face side of a distal end portion of the leg portion 50. The distinguishing portion 52 is exposed through a later-described exposure hole 56, and can be detected from outside the cartridge 10.

As shown in FIGS. 2 to 6, the aperture 22 formed in the angled wall 20 of the lower case 16 opens in a square shape and exposes the finger-engaging portion 46. The exposure hole 56 is formed in a long, narrow shape in the lower wall 16U of the lower case 16, along a direction parallel to the angled wall 20.

When the plug 32 is positioned at the recording-disabled position (a position for when writing is prohibited), the aperture 22 enters a state of being closed by the plug 32 (see FIGS. 2 and 3).

If the cartridge 10 is loaded into a drive device when the plug 32 is positioned at the recording-disabled position, the drive device detects the position of the distinguishing portion 52 through the exposure hole 56 and determines that the cartridge 10 is in the recording-disabled state.

When the finger-engaging portion 46 is engaged by a finger, and the plug 32 is slidingly moved and positioned at the recording-enabled position (a position for when writing is allowed), the aperture 22 enters a state of not being closed by the opening/closing plate portion 38 of the plug 32 (refer to the finger-engaging portion 46 as shown by the broken line in FIG. 3).

If the cartridge 10 is loaded into a drive device when the plug 32 is positioned at the recording-enabled position, the drive device detects the position of the distinguishing portion 52 through the exposure hole 56 and determines that the cartridge 10 is in the recording-enabled state.

The plug 32 is colored with a color that can be easily distinguished from a color of the case 12, so that a user can easily distinguish the different positions of the plug 32, and thus distinguish the recording-enabled state from the recording-disabled state, by visual observation of the rear side of the cartridge. For example, the case 12 may be colored black and the plug 32 colored red. In such a case, the red member is hardly exposed at all in the recording-enabled state, but the red member covers the aperture 22 in the recording-disabled state.

As described above, in the first embodiment, even though the angled wall 20 forming the angled surface 20S is provided at the back wall side (rear side) of the lower case 16, because the aperture 22 which exposes the opening/closing plate portion 38 of the plug 32 is formed in the angled wall 20, the write-protect portion 30 can be provided at the rear portion of the cartridge 10. Therefore, even when the cartridge 10 is in an accommodated state in a library, a user can easily judge whether the cartridge 10 is in the recording-enabled state or the recording-disabled state by observing the back face side of the cartridge 10. Further, as shown in FIGS. 2 and 3, the aperture 22 is formed in the angled wall 20, and is not formed in a rear wall 14B of the upper case 14 or the rear wall 16B of the lower case 16. Therefore, a label area 58 can be formed over the whole of the rear wall outer side of the case 12, and the label area 58 is not constricted.

Moreover, because the exposure hole 56 which exposes the distinguishing portion 52 of the leg portion 50 is formed in the lower face side of the lower case 16, when the cartridge 10 is assembled, the plug 32 can be brought down toward the support portion 34 from one direction (that is, from above the lower case 16), with the distinguishing portion 52 of the leg portion 50 being exposed through the exposure hole 56 and the finger-engaging portion 46 being exposed through the aperture 22. Thus, the plug 32 can be easily assembled to the lower case 16.

Figure 16:
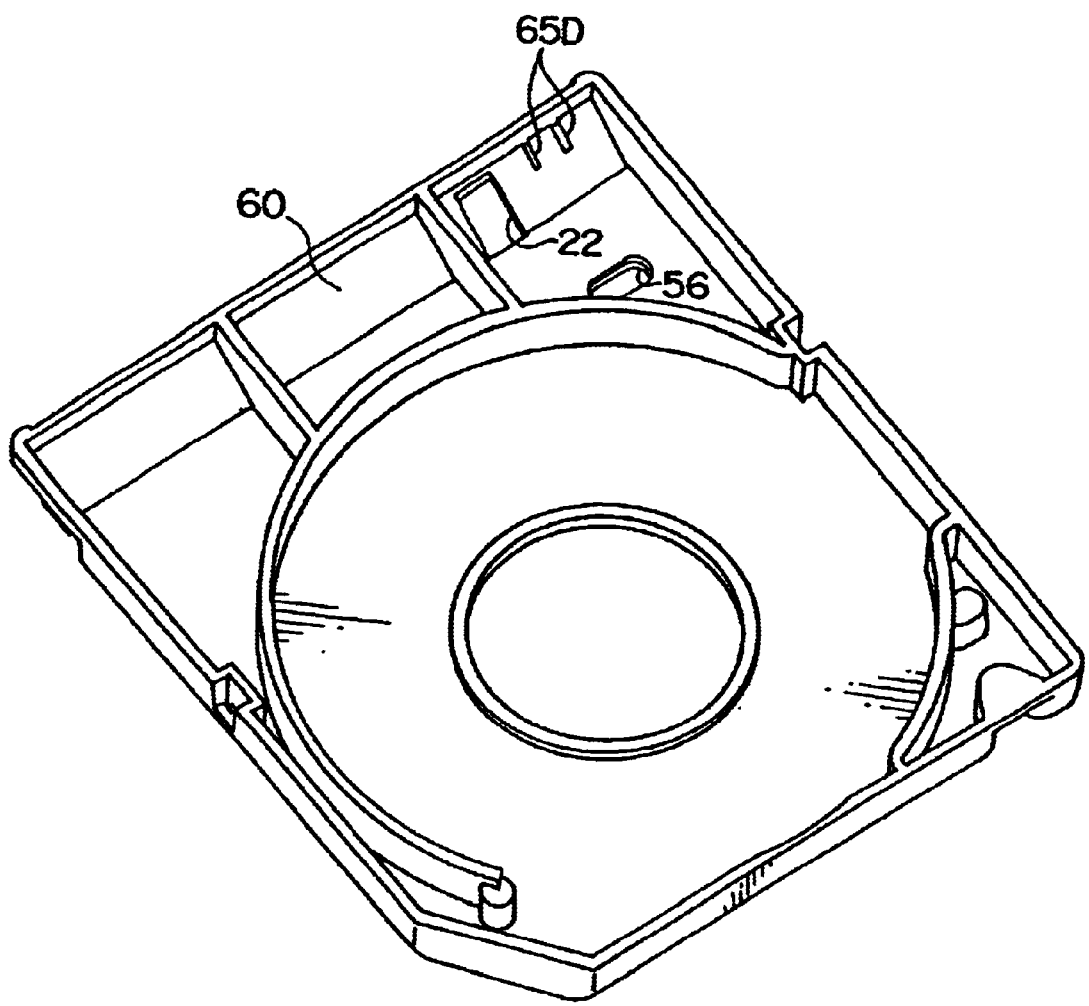
FIG. 16 is a perspective view showing a variant example of the lower case of the cartridge relating to the first embodiment.

As shown in FIG. 16, a structure is also possible in which an angled wall 60 is formed along the whole length of the back face side of the lower case, and two engaging grooves 65D, for engaging with the engaging rib 44, are directly provided to the inner side of the angled wall 60.

Second Embodiment

Next, a second embodiment will be described. Structural elements which are the same in the second embodiment as in the first embodiment are given the same reference numerals, and explanations thereof are omitted.

Figure 17:
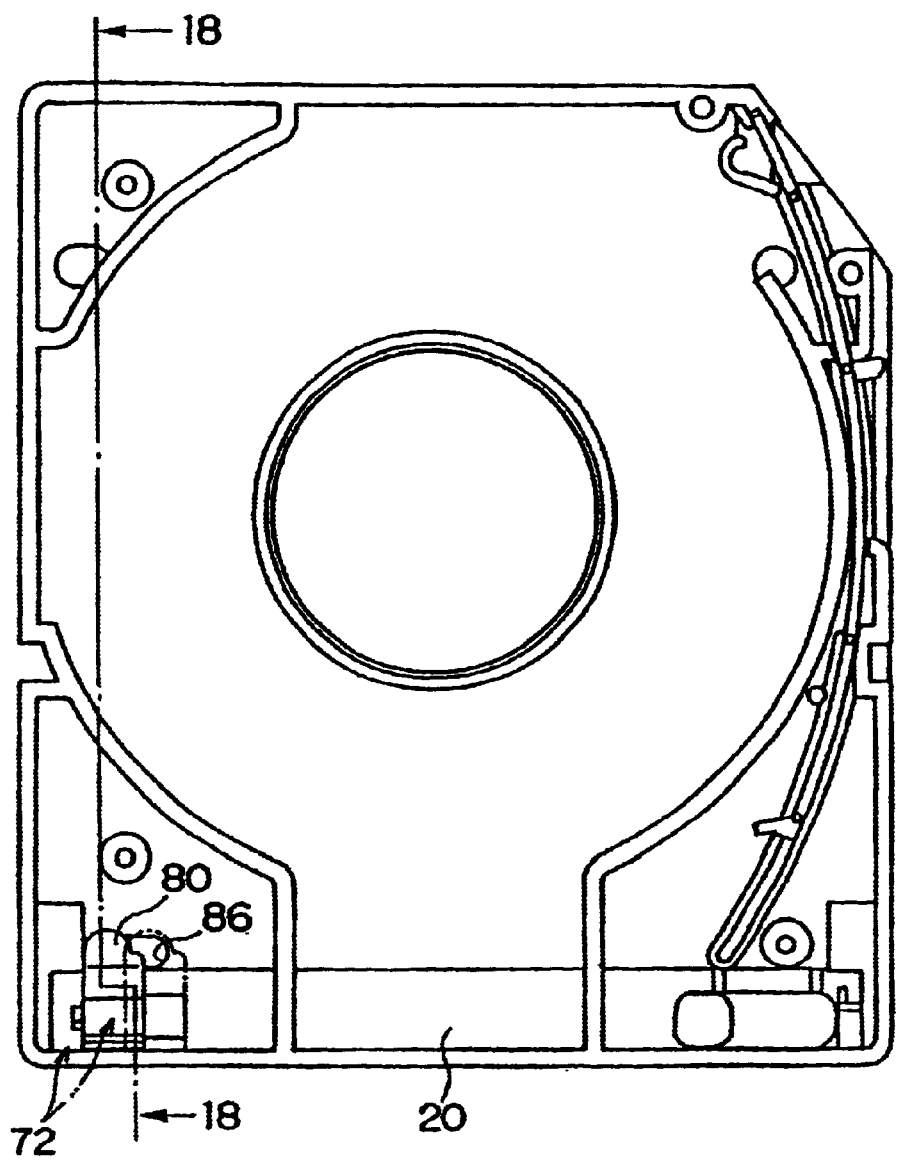
FIG. 17 is a plan view of a lower case of a cartridge relating to a second embodiment, which view shows a state in which an erroneous erasure prevention plug is slidingly moveably attached.
Figure 18:
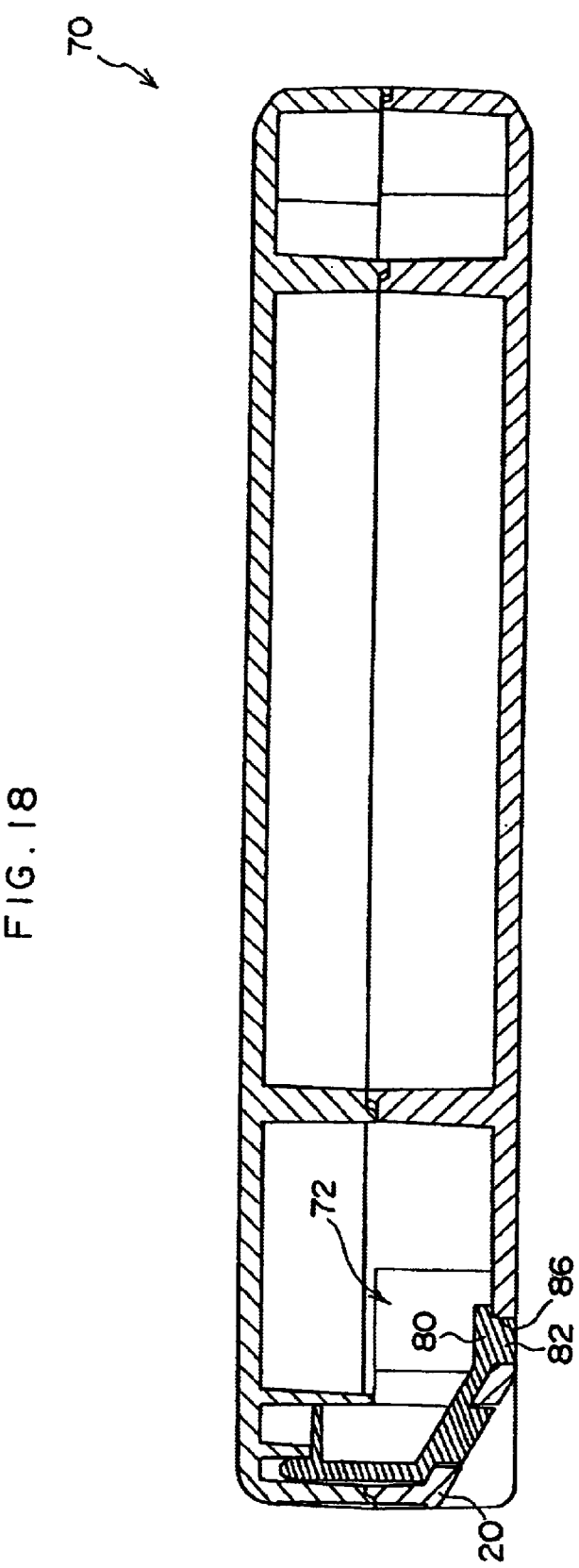
FIG. 18 is a side sectional view, cut along the line indicated by arrows 18—18 in FIG. 17, showing the cartridge relating to the second embodiment.

As shown in FIGS. 17 and 18, in a cartridge 70 relating to the second embodiment, a leg portion 80 of an erroneous erasure prevention plug 72, which switches between the recording-enabled state and the recording-disabled state, is shorter than in the first embodiment. In addition, an exposure hole 86 which exposes a detectable portion 82, which is formed at a lower face side of the leg portion 80, is provided closer to a lower end of the angled wall 20 than in the first embodiment.

Consequently, the erroneous erasure prevention plug 72 can be made smaller, and the leg portion 80 can be made less susceptible to breakage.

The present invention has been explained by description of the above embodiments. However, these embodiments are merely examples, and various alterations can be implemented within a scope not departing from the spirit of the present invention. Obviously, the scope of any rights to the present invention is not to be limited to the embodiments described above.

Because the present invention has the structure described above, a recording medium cartridge can be realized with which, even though an angled surface is formed at a back face side of a case, a user can observe the back face side and judge whether the cartridge is in a recording-allowed state or a recording-prohibited state, without a label area having been reduced.

What is claimed is:

1. A cartridge for accommodating a recording medium, the cartridge being loadable in a predetermined direction at a drive device, and being selectively switchable between at least two modes, one of the modes allowing writing of information to the recording medium, and another of the modes prohibiting writing of information to the recording medium, the cartridge comprising:
    a case for accommodating the recording medium and including
        a pair of major outer surfaces that are opposed to each other,
        an outer wall face at a rear end of the case relative to the predetermined direction of loading and
        an angled face adjacent to the outer wall face, the angled face including an opening, the angled face forming an acute angle with at least one of the major outer surfaces; and
    a switching member for switching between the modes, the switching member including an operation portion for the switching, the operation portion being exposed through the opening.

2. The cartridge of claim 1, wherein the case further comprises an upper outer face and a lower outer face, and the angled face is formed at a boundary region between the rear end outer wall face and one of the upper outer face and the lower outer face.

3. The cartridge of claim 1, wherein the switching member is provided so as to be slideable along the angled face, and switches between the modes by being slid.

4. The cartridge of claim 1, wherein the case further comprises an upper outer face and a lower outer face, the angled face is formed at a boundary region between the rear end outer wall face and one of the upper outer face and the lower outer face, the switching member is provided so as to be slideable along the angled face, and the switching member switches between the modes by being slid.

5. The cartridge of claim 1, wherein the switching member comprises a plate which, in one of the modes, covers the opening.

6. The cartridge of claim 5, wherein the plate comprises coloration with a color different from the case.

7. The cartridge of claim 1, wherein the rear end outer wall face comprises a region for application of a label.

8. The cartridge of claim 1, wherein the switching member comprises a portion whose position is detectable from outside the cartridge, the portion distinguishing between the modes, and the case includes a hole which exposes the portion.

9. The cartridge of claim 8, wherein the hole is formed in a lower outer face of the case.

10. The cartridge of claim 9, wherein the hole is formed adjacent to a lower end of the angled face.

11. A cartridge of claim 1, wherein the angled face extends in a direction intersecting the direction of loading.

12. A cartridge for accommodating a recording medium, the cartridge being loadable in a predetermined direction at a drive device, and being selectively switchable between at least two modes, one of the modes allowing writing of information to the recording medium, and another of the modes prohibiting writing of information to the recording medium, the cartridge comprising:

a case for accommodating the recording medium and including
an outer wall face at a rear end of the case relative to the predetermined direction of loading and
an angled face adjacent to the outer wall face, the angled face including an opening; and
a switching member for switching between the modes, the switching member including an operation portion for the switching, the operation portion being exposed through the opening,
wherein the angled surface is formed across substantially a whole width of the cartridge in a direction intersecting the direction of loading.

13. A cartridge for accommodating a recording medium, the cartridge being loadable in a predetermined direction at a drive device, and being selectively switchable between at least two modes, one of the modes allowing writing of information to the recording medium, and another of the modes prohibiting writing of information to the recording medium, the cartridge comprising:

a case for accommodating the recording medium and including
an outer wall face at a rear end of the case relative to the predetermined direction of loading and
an angled face adjacent to the outer wall face, the angled face including an opening; and
a switching member for switching between the modes, the switching member including an operation portion for the switching, the operation portion being exposed through the opening,
wherein the case further comprises an upper outer face and a lower outer face, and the angled face is formed at a boundary region between the rear end outer wall face and one of the upper outer face and the lower outer face, and
wherein the angled face is inclined at an angle of substantially 30° with respect to the lower outer face of the case.

14. A cartridge for accommodating a recording medium, the cartridge being loadable in a predetermined direction at a drive device, and being selectively switchable between at least two modes, one of the modes allowing writing of information to the recording medium, and another of the modes prohibiting writing of information to the recording medium, the cartridge comprising:

a case for accommodating the recording medium and including
an outer wall face at a rear end of the case relative to the predetermined direction of loading and
an angled face adjacent to the outer wall face, the angled face including an opening; and
a switching member for switching between the modes, the switching member including an operation portion for the switching, the operation portion being exposed through the opening,
wherein the angled surface is formed across substantially a whole width of the cartridge in a direction intersecting the direction of loading, and the rear end outer wall face comprises a region for application of a label.

15. The cartridge of claim 14, wherein the case further comprises an upper outer face and a lower outer face, and the angled face is formed at a boundary region between the rear end outer wall face and one of the upper outer face and the lower outer face.

16. The cartridge of claim 14, wherein the switching member is provided so as to be slideable along the angled face, and switches between the modes by being slid.

17. The cartridge of claim 16, wherein the case further comprises an upper outer face and a lower outer face, and the angled face is formed at a boundary region between the rear end outer wall face and one of the upper outer face and the lower outer face, and the angled face is inclined at an angle of substantially 30° with respect to the lower outer face of the case.

18. The cartridge of claim 17, wherein the switching member comprises a portion whose position is detectable from outside the cartridge, the portion distinguishing between the modes, and the case includes a hole which exposes the portion.

19. The cartridge of claim 18, wherein the hole is formed in a lower outer face of the case.

20. The cartridge of claim 19, wherein the hole is formed adjacent to a lower end of the angled face.

21. The cartridge of claim 20, wherein the portion has a short cylindrical column shape.

* * * * *